Sept. 29, 1964            R. LEE            3,151,261
DYNAMO-ELECTRIC APPARATUS
Filed Aug. 20, 1959            3 Sheets-Sheet 1
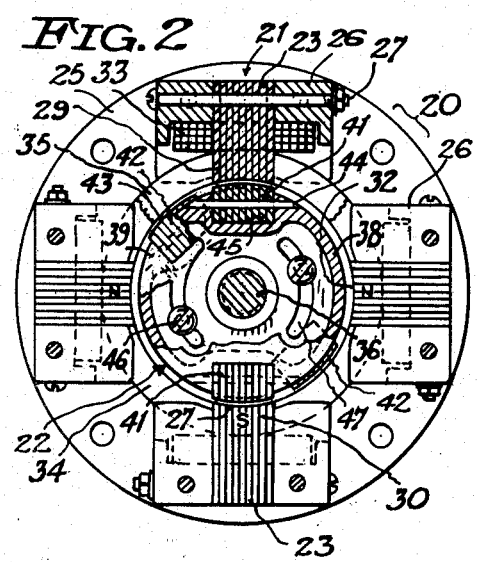
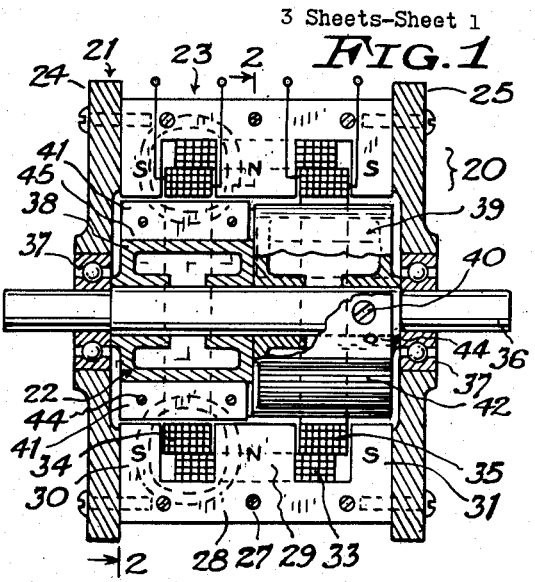
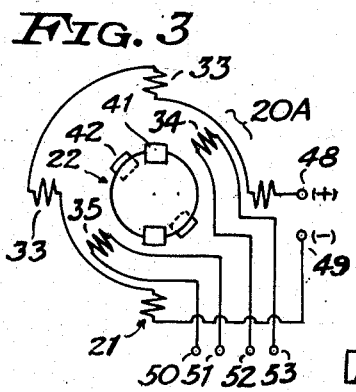
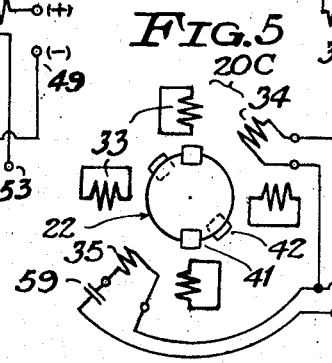
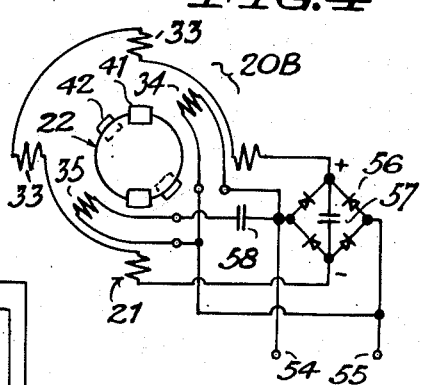
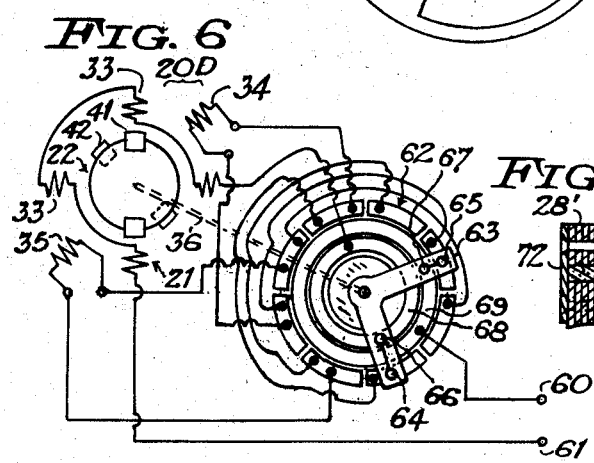
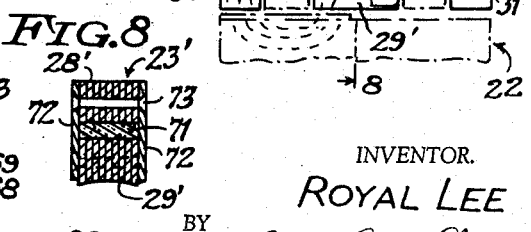
INVENTOR.
ROYAL LEE
BY
ATTORNEY Sept. 29, 1964

R. LEE 3,151,261

DYNAMO-ELECTRIC APPARATUS

Filed Aug. 20, 1959

INVENTOR.
ROYAL LEE
BY
Christopher L. Waal
ATTORNEY

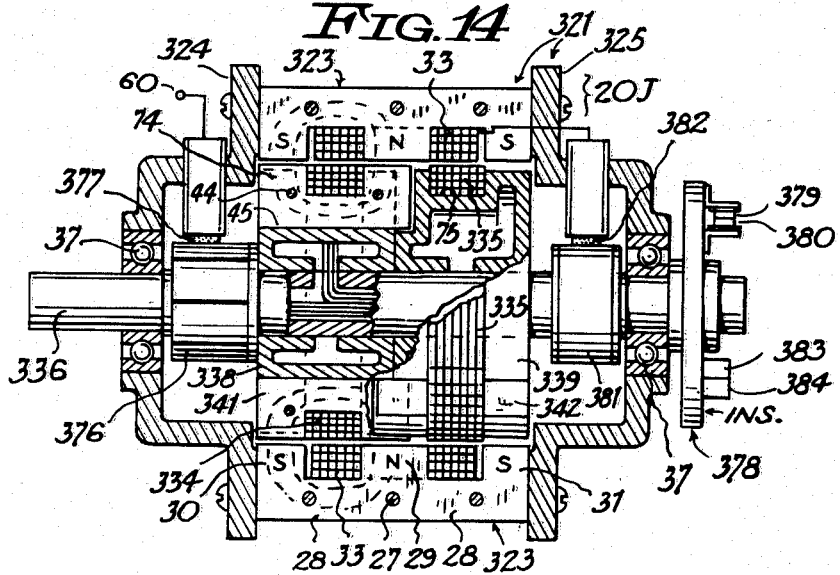
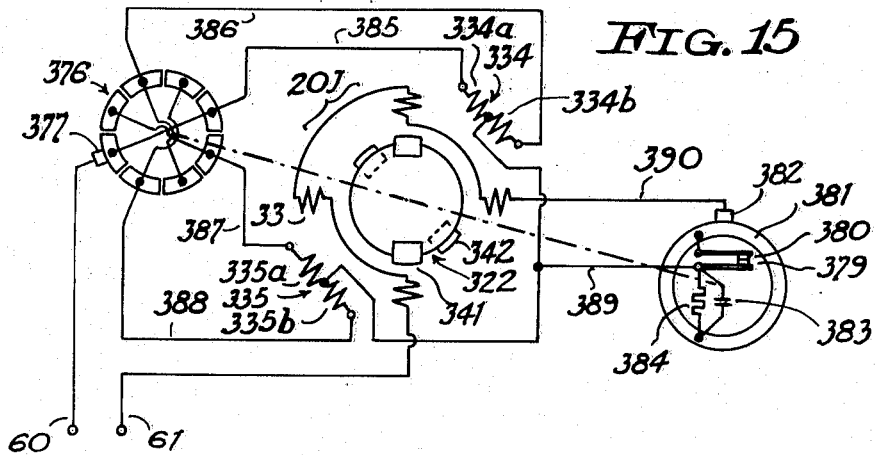

United States Patent Office 3,151,261
Patented Sept. 29, 1964

3,151,261
DYNAMO-ELECTRIC APPARATUS
Royal Lee, Elm Grove, Wis., assignor to Lee Foundation for Nutritional Research, Milwaukee, Wis., a corporation of Wisconsin
Filed Aug. 20, 1959, Ser. No. 834,999
15 Claims. (Cl. 310—198)

This invention relates to dynamo-electric machines adapted for various uses, and to electric systems including the same.

An object of the invention is to provide an improved and efficient dynamo-electric machine having relatively rotatable members which are so arranged as to permit the use of simple magnetic parts and windings and to enable inexpensive manufacture and easy assembly of the machine.

Another object is to provide a dynamo-electric machine of this character which is capable of arrangement as a polyphase alternator or motor, as a split-phase motor, or as a commutator-type motor.

Still another object is to provide a dynamo-electric machine including annular armature windings which are disposed coaxially of the machine and cooperate with several axially spaced sets of field poles, the relation being such that these windings may be either stationary or rotatable.

A further object is to provide a dynamo-electric machine having a low-inertia rotor, so as to permit rapid starting and stopping and to reduce starting current.

A further object is to provide a dynamo-electric machine which will form both an alternator and a magnetic clutch.

A further object is to provide a dynamo-electric machine having an improved form of permanent magnet excitation.

A further object is to provide a dynamo-electric machine which is arranged to form a commutator-type governor-controlled motor and which is so constructed as to reduce brush friction.

A further object is to provide an electric system including an alternator with direct-current field excitation and including regulating means having vibrating contacts placed in an alternating current circuit, so as to insure a long service life for the contacts.

The invention further consists of the several features hereinafter described and claimed.

In the accompanying drawings, illustrating certain embodiments of the invention, FIG. 1 is a longitudinal sectional view of a dynamo-electric machine constructed in accordance with the invention;

FIG. 2 is a transverse sectional view of the machine, taken generally on the line 2—2 of FIG. 1;

FIG. 3 is a wiring diagram showing the machine arranged for use as a two-phase inductor-type alternator or motor;

FIG. 4 is a wiring diagram showing the machine arranged for operation as a two-phase synchronous motor from a single-phase power source;

FIG. 5 is a wiring diagram showing the machine arranged for operation as an induction motor;

FIG. 6 is a wiring diagram showing the machine arranged for use as a series-type commutator motor for operation on alternating current or direct current;

FIG. 7 is a fragmentary view of a modified form of dynamo-electric machine including a stator core with permanent magnet excitation, parts being broken away and parts being shown in section;

FIG. 8 is a detail sectional view taken generally on the line 8—8 of FIG. 11;

FIG. 14 is a longitudinal sectional view of another modified form of machine arranged as a governor-controlled universal motor, and FIG. 15 is a wiring diagram of the machine of FIG. 14.

Figure 9:
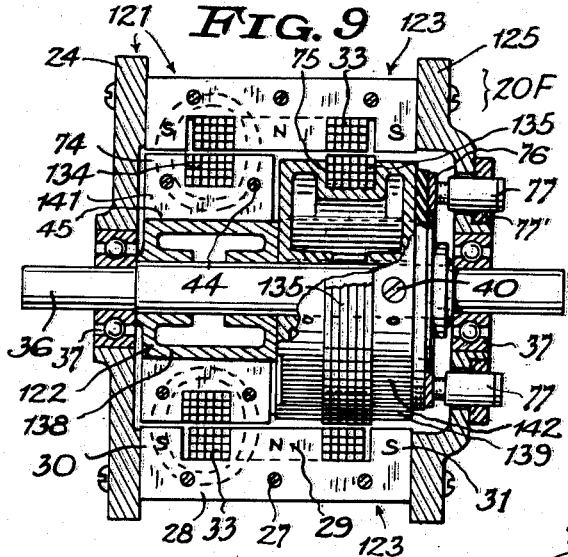
FIG. 9 is a longitudinal sectional view of a modified form of dynamo-electric machine arranged as a series-type commutator motor.

Referring to FIGS. 1 and 2 of the drawings, the numeral 20 designates generally a dynamo-electric machine of the invention, the machine comprising a stator 21 and a cooperating rotor 22 disposed within the stator with an air gap between them.

The stator comprises a plurality of at least three axially spaced sets, groups or assemblies of poles, three sets of poles being shown, and each set consisting of a plurality of pairs of poles. Each pair of poles are diametrically opposite and of the same polarity, and the peripherally adjacent poles in each set are of opposite polarity. The poles of the several pole sets are preferably formed by a plurality of equi-angularly spaced multiple-legged magnetic cores 23 extending longitudinally of the stator and arranged in radial planes. By way of example, two pairs of stator cores are shown, angularly adjacent cores being spaced 90°. However, a greater number of pairs of stator cores may be provided. The stator cores, here shown to be E-shaped, are suitably supported, as by a frame including non-magnetic end members or plates 24 and 25 connected by non-magnetic spacers 26 to which the cores are clamped, as by screws 27. The stator cores are preferably laminated, the laminations extending axially of the stator. Each of the four stator cores comprises a yoke 28 extending axially of the stator and three parallel, inwardly directed, pole-forming legs 29, 30 and 31, the middle or intermediate leg 29 being here shown as slighty wider in an axial direction than the outer legs 30 and 31. The inner ends of the axially spaced legs of the several stator cores present cylindrically concave pole faces 32 lying in a common cylindrical surface, the central planes of the pole faces of angularly adjacent cores being spaced 90°.

The stator cores carry respective windings 33 which surround the middle legs 29 of these cores adjacent to the core yokes, these windings normally forming field windings and being energized as hereinafter described. Each stator core winding 33 when energized magnetizes the middle core leg 29 to one polarity and the two outer legs 30 and 31 to the other polarity. The middle legs of opposite stator cores have the same polarity, and the middle legs of angularly adjacent stator cores are of opposite polarity.

A pair of axially spaced annular armature windings 34 and 35 are arranged coaxially of the stator, the winding 34 extending between the middle legs 29 and outer legs 30 of the stator cores, and the winding 35 being disposed between the middle legs and the other outer legs 31 of the stator cores. These windings are energized as hereinafter described.

The rotor 22 includes a shaft 36 the opposite end portions of which are journalled in ball bearings 37 mounted in the end plates 24 and 25 of the machine frame. A pair of aligned hollow rotor body sections 38 and 39 of light weight non-magnetic material, such as aluminum, are rigidly secured on the shaft in tandem abutting relation, as by set screws 40, FIG. 1, to form a rotor body, and carry respective pairs or sets of diametrically opposite magnetic cores 41 and 42 of bar-like shape which extend longitudinally of the rotor, the diametrical plane of the rotor cores 42 being angularly spaced 45° from the diametrical plane of the rotor cores 41. The rotor cores, which have arcuate outer faces 43 lying in a common cylindrical surface, are suitably secured to the rotor body, as by anchoring them by cross pins or rivets 44 in exterior channels 45 formed longitudinally in the rotor body sections. In some instances, the two rotor body sections are relatively angularly adjustable to vary the angular spacing of the two sets of rotor cores. The rotor body sections are here shown to be clamped axially together in angularly adjusted position by screws 46 passing through arcute slots 47 in the rotor body 38. The rotor cores are about one-half of the length of the three-legged stator cores, and are here shown to be laminated, the laminations extending longitudinally of the rotor. As hereinafter more fully described, the rotor cores 41 form projecting reluctance-varying parts for magnetically bridging the outer legs 30 and middle legs 29 of the stator cores, while the rotor cores 42 form similar parts for magnetically bridging the middle legs 29 and outer legs 31 of the stator cores. The angular spacing of 45° between the two sets of rotor cores 41 and 42 corresponds to an electrical angle of 90°. The number of rotor cores in each set is one-half the number of stator cores.

The two sets of rotor cores 41 and 42 are here shown to be axially spaced, but in some instances the inner ends of these cores may overlap axially if there is a sufficient spacing between them, as shown in FIG. 14, illustrating another form of the invention hereinafter described. In the latter case, the axial width of the middle legs of the stator cores may be somewhat less than is shown in FIG. 1. Each stator core middle leg 29 forms, in effect, two laterally adjacent poles of the same polarity.

The dynamo-electric machine of the invention may be employed in various ways. In FIG. 3, the machine is designated by the numeral 20A and is of the inductor type, the windings of the machine being connected to form a two-phase alternator or a synchronous two-phase motor. The stator or field windings 33 are connected in series to a pair of input terminals 48 and 49 to which unidirectional current is supplied. The armature windings 34 and 35 are connected to respective pairs of terminals 50, 51 and 52, 53.

When the machine is used as an alternator, two-phase current will be supplied by the armature windings 34 and 35 to the corresponding pairs of armature terminals. At the time the stator and rotor occupy the relative positions shown in FIGS. 1 and 2, the upper and lower field windings will establish magnetic flux paths in the left-hand halves of the upper and lower stator cores and in the left-hand rotor cores 41, as indicated in FIG. 1. When the rotor cores 41 pass clockwise over the vertical stator cores 23, as viewed in FIG. 2, the resultant flux change will induce a voltage in the left-hand armature winding 34, FIG. 1, and the subsequent passage of these rotor cores under the poles of the horizontal stator cores will induce a voltage of opposite polarity in this armature winding. As the rotor rotates 45° clockwise from the position shown in FIGS. 1 and 2, the left-hand rotor cores 41, FIG. 1, will leave the vertical stator cores, and the right-hand rotor cores 42 will pass over the right-hand halves of the vertical stator cores, causing the field flux created by the upper and lower field windings 33 to shift endwise of these stator cores from the left-hand halves of the stator cores to the right-hand halves of these cores and to pass through the right-hand rotor cores 42, thus inducing a voltage in the right-hand armature winding 35; and the subsequent passage of the right-hand rotor cores under the horizontal stator cores will induce a voltage of opposite polarity in this armature winding. It will thus be seen that the voltages induced in the two armature windings 34 and 35 are 90° out of phase, and that the field flux in each stator core shifts back and forth between the left-hand and right-hand halves of this core incident to the cyclic changes in the reluctance of the magnetic circuits.

When the machine of FIG. 3 is used as a synchronous motor, the field windings are supplied with unidirectional current, and two-phase current is supplied to the armature terminals 50, 51, and 52, 53, to energize the armature windings 34 and 35, thus effecting rotation of the rotor.

In FIG. 4 the machine of the invention, designated by the numeral 20B, is arranged to operate as a two-phase or split-phase synchronous motor from single-phase supply conductors 54, 55. The two sets of rotor cores 41 and 42 are disposed at about 45° to each other, as in FIGS. 1 to 3. A rectifier 56, here shown to be of the full-wave bridge type, has its input terminals connected to the supply conductors, and has its output terminals connected to the series-connected field windings 33 to provide direct current excitation. If desired, a filter capacitor 57 may be connected across the input terminals of the rectifier. The armature winding 34 of the motor is connected directly across the supply conductors 54, 55, while the armature winding 35 is connected to the supply conductors through a phase-shifting capacitor 58. The motor of FIG. 4 will operate substantially like the motor of FIG. 3, but requires only a single-phase power source.

In FIG. 5, the machine designated by the numeral 20C, is arranged as an induction motor operable from single-phase supply conductors 54, 55. The stator windings 33 of the machine, instead of being energized by unidirectional current are connected in one or more closed circuits to form induction or secondary windings. The armature winding 34 of the motor is connected directly across the supply conductors, while the armature winding 35 is connected to the supply conductors through a phase-shifting capacitor 59. The machine will tend to run at synchronous speed because of the salient pole construction. The four stator windings 33 are here shown to form individual closed circuits. In some instances, each stator winding may be in the form of a single-turn closed loop or band of copper.

In the present instance, the machine of FIGS. 1 and 2 is provided with two pairs of stator cores and two pairs of rotor cores (one pair for each rotor section). In the case of certain types of alternators, a larger number of pairs of stator cores will result in an increase in the output frequency for a given rotor speed, and in the case of certain types of alternating current motors a larger number of stator cores will result in a decrease of motor speed for a given supply frequency.

In FIG. 6, the machine, designated by the numeral 20D, is arranged as a series or universal motor operable on either direct current or alternating current from line conductors 60 and 61. The motor (four-pole in the present instance) is provided with a stationary commutator 62 with eight cross-connected segments, opposite segments being connected together. Two opposite pairs of segments spaced 90° are connected to the terminals of the armature winding 34, and the two other pairs of segments, also spaced 90° but angularly offset 45° with respect to the first pairs of segments, are connected to the terminals of the armature winding 35. A brush carrier 63 rotatable with the rotor shaft mounts a pair of brushes 64 and 65 which bear on the stationary commutator and are spaced 90°, and also mounts another pair of brushes 66 and 67 which bear on a pair of stationary slip rings 68 and 69 concentric with the commutator. One terminal of the group of series-connected field windings 33 is connected to the supply conductor 61. The other field terminal is connected to the slip ring 68, and the slip ring 69 is connected to the other supply conductor 60. The slip ring brushes 66 and 67 are connected to the commutator brushes 64 and 65, respectively, thus connecting the armature windings in series with the field windings. In operation, the two armature windings are alternately energized, first in one sense and then in the other, and the rotor cores undergo attraction and repulsion with respect to the field poles to provide a continuous torque on the rotor.

When the machine of FIGS. 1 and 2 is used as an alternator or as a synchronous motor, as above described, and in other cases where unidirectional field flux is desired, as in a direct current motor, it is possible to provide permanent magnet excitation for the stator cores and thus eliminate the field windings 33. A modified dynamo-electric machine 20E for this purpose is shown in FIGS. 7 and 8, wherein the stator 21' comprises E-shaped stator cores 23' each with a yoke section 28', outer legs 30' and 31', and a middle or intermediate leg 29', the latter being in the form of a T-shaped pole piece with an elongated head 70. A permanent magnet 71 intervenes between the pole piece head 70 and the yoke section of the core, and is desirably formed of a plate of oriented barium ferrite polarized transversely of its thickness, the opposite flat faces of the plate abutting against the pole piece head and the yoke section of the core. One suitable commercial form of the permanent magnet material is known as "Index V." The magnet plate is somewhat longer than the axial dimension of the pole face of the middle core leg, and the pole piece head 70 provides a relatively large contact area with the magnet plate. The permanent magnet and middle pole piece are suitably secured to the main body of the stator core, as by non-magnetic side plates or cheek plates 72 having riveted connections 73 with the core yoke and pole piece. The stator cooperates with a core-carrying rotor 22, as in FIG. 1, and the machine is otherwise the same as that of FIG. 1, being provided with armature windings 34 and 35 extending in the spaces between the stator core legs.

Figure 10:
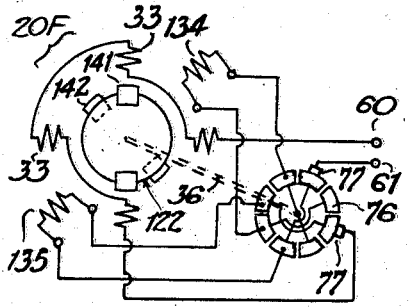
FIG. 10 is a wiring diagram of the machine of FIG. 9.

The modified form of dynamo-electric machine 20F shown in FIGS. 9 and 10 includes a stator 121 and a rotor 122 rotatable therein. The stator is generally similar to that of FIG. 1 and includes E-shaped cores 123 having field windings 33 on their middle legs. The machine is further provided with a pair of axially spaced armature windings 134 and 135 which are similar to the armature windings of FIG. 1 but are carried by the rotor in coaxial relation thereto. In place of the two sets of straight rotor cores of FIG. 1, the rotor of FIG. 9 carries two sets of U-shaped rotor cores 141 and 142 with outwardly projecting legs 74, the two coaxial armature windings extending between the legs of the respective sets of rotor cores. The rotor cores are rigidly mounted on a pair of hollow rotor body sections 138 and 139 which are generally similar to those of FIGS. 1 and 2 and are carried on a shaft 36 journalled in stator end frame members 24 and 125. The rotor body sections have annular grooves 75 to receive the armature windings. The two armature windings are connected, as in the machine of FIG. 6, to a cross-connected eight-segment commutator 76 which, however, is carried by the rotor, and a pair of stationary brushes 77 spaced 90° bear on the commutator, the brushes being carried by a mounting ring 77' which is angularly adjustable on the frame end plate 125 to obtain an optimum brush setting. This construction obviates the use of the rotating brush carrier and slip rings of FIG. 6. The field windings and rotor windings are here shown to be arranged in series to form a series-type or universal motor connected to line conductors 60, 61, supplying either alternating current or direct current. It is also possible to connect the windings to form a shunt motor, and to provide permanent magnet excitation of the fields, as in FIGS. 7 and 8.

Figure 11:
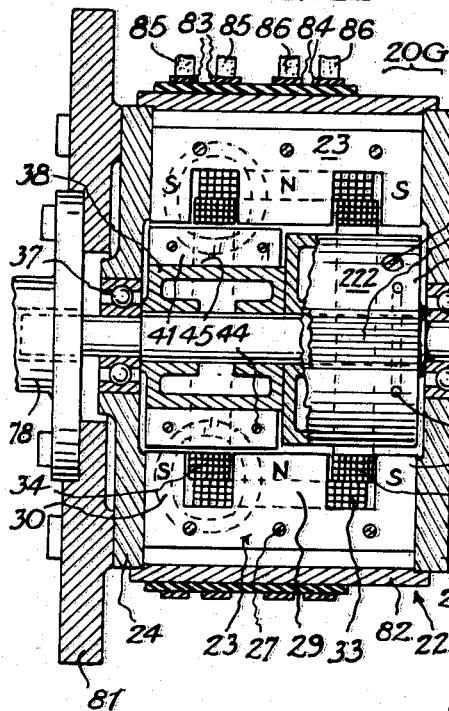
FIG. 11 is a longitudinal sectional view of another modified form of dynamo-electric machine adapted to operate as an alternator and as a magnetic clutch.
Figure 12:
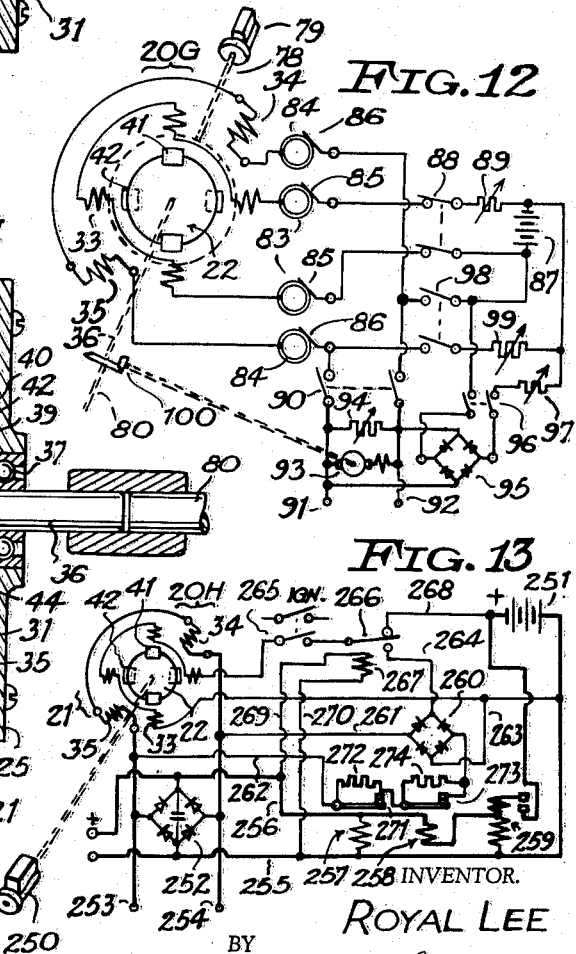
FIG. 12 is a wiring diagram of an electric system embodying the machine of FIG. 11.

The modified form of dynamo-electric machine 20G shown in FIGS. 11 and 12 is adapted to form an alternator (or synchronous motor) and a magnetic clutch or brake, and includes a stator 221 and a cooperating rotor 222. When used as a combined alternator and clutch, both the stator and rotor of the machine are mounted for rotation, one of these members, for example, the "stator" 221 forming an input member connected to the shaft 78 of an engine 79 or other prime mover, and the rotor 222 forming an output member, the shaft 36 thereof being coupled to a driven or output shaft 80. If desired, the "stator" can be mounted directly on the flywheel 81 of the engine. The machine proper is generally similar to that of FIGS. 1 and 2 except that the two rotor body sections 38 and 39 have been angularly shifted on the rotor shaft to place the two sets of rotor cores 41 and 42 in radial planes spaced 90° apart instead of 45° apart, thus forming a single-phase machine. The "stator" or outer member 221 is provided with a coaxial outer sleeve 82 carrying two pairs of slip rings 83 and 84 on which bear respective sets of stationary brushes 85 and 86. The slip rings 83 and brushes 85 make connections with the series-connected field windings 33, and the slip rings 84 and brushes 86 make connections with the armature windings 34 and 35 which latter are connected in series-aiding relation. In some cases, the armature windings may be connected in parallel. The field brushes 85 are connected to a source of direct current, such as a battery 87, FIG. 12, through a switch 88 and rheostat 89 to vary the field excitation. The armature brushes 86 are connected to terminals of a double-pole switch 90, and the other terminals of the switch are connected to a pair of line conductors 91 and 92 across which a load is connected. The load is here shown to include a load element 93, such as a series-type electric motor, a variable resistor 94, and a rectifier 95. In some instances, the rectifier is used for recharging the battery, as through a switch 96 and resistor 97. The armature brushes 86 can also be connected to the battery through a double-pole switch 98 and rheostat 99 to form a clutching circuit by which the armature windings are supplied with direct current.

In operation, the field-forming outer machine member 221 is driven by the engine or other prime mover, and the field windings are energized from the battery 87. If the armature circuit is open, the output member or rotor 222 normally remains at rest, and the relative rotation of the machine members will impress an alternating voltage on the terminals of the armature windings. If an electrical load is applied to the armature circuit, a magnetic slipping clutch action will take place, causing rotation of the rotor. This clutch action can be varied by adjusting the rheostat 94. If the load member 93 is in the form of an electric motor, as shown, such as for traction purposes in a vehicle or elevator, energy which would otherwise be dissipated can be recovered in the form of mechanical energy. In some cases the motor may have a coupling or gearing connection 100 to the output shaft 80. If direct current is fed into the alternator armature circuit, as from the battery 87 by way of the switch 98, after acceleration of the rotor, the two rotating machine members will become magnetically locked together, thus providing a direct drive from the prime mover 79 to the output shaft 80.

Figure 13:
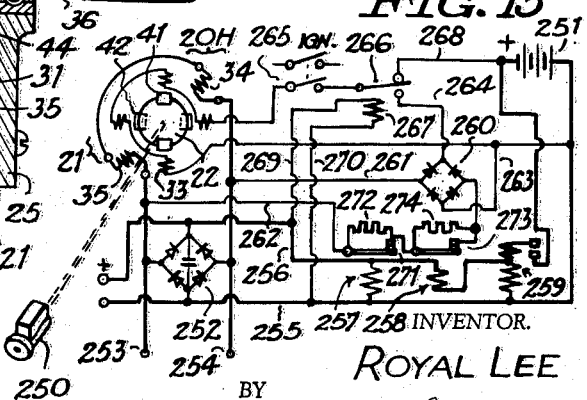
FIG. 13 is a wiring diagram of a regulated dynamo-electric machine of the invention applied to a motor vehicle electric system.

The modification of FIG. 13 includes an alternator-forming dynamo-electric machine 20H similar to the machine of FIG. 1 except that the two sets of rotor cores 41 and 42 have been relatively shifted to a 90° position, as in the manner of FIG. 12, to provide a single-phase machine. The alternator is driven by an internal combustion engine 250 of a motor vehicle and forms part of an electric system for the vehicle. The system also includes a storage battery 251 which is charged from the alternator through a main rectifier 252 connected to the armature output leads 253, 254, the battery being connected to the output terminals of the rectifier by conductors 255 and 256. The system further includes a vibrating-contact regulator including either or both of a voltage-responsive unit 257 and a current-responsive unit 258. A cut-out or reverse current relay 259 is also provided, but in some cases may be omitted. The current coils of the regulator unit 258 and cut-out 259 are included in the conductor 256. The field current of the alternator is supplied through a rectifier 260 the input to which is connected to the alternator armature by conductors 261 and 262 and is controlled by the regulator, as hereinafter described. The output of the field supply rectifier 260 is connected to the field windings by conductors 263 and 264, the former being also connected to one terminal of the battery. The conductor 264 includes in series a control switch 265 (forming a part of an ignition switch assembly) and the switch 266 of a teaser relay 267, the relay switch 266 when in de-energized position being connected to the other terminal of the battery through a conductor 268 so as to initially excite the alternator field from the battery when starting the engine. The teaser relay winding is connected by conductors 269 and 270 to the output terminals of the main rectifier 252 so that when the alternator is started in operation the alternator voltage will operate the relay 267 to disconnect the field from the battery and render the alternator self-exciting. Instead of energizing the relay winding through the main rectifier 252 it may be energized directly from the alternator output leads 253, 254.

The voltage-responsive regulator unit 257 includes vibratory contacts 271 shunted by a resistor 272, and the current-responsive regulator unit 258 includes similar vibratory contacts 273 shunted by a resistor 274. The two sets of regulator contacts are here shown to be connected in series in the input conductor 262 for the field supply rectifier 260. It will be noted that these regulator contacts are in an alternating current circuit, so that they will have a relatively long service life.

In the operation of the system of FIG. 13, the closing of the control switch 265 preparatory to starting the engine initially excites the alternator field from the battery 251, and after the engine is started the alternator voltage immediately builds up, energizing the teaser relay 267 and thus effecting self-excitation through the rectifier 260. After reaching a predetermined speed the alternator will charge the battery through the main rectifier 252 and the then closed contacts of the cut-out relay 259. As the alternator voltage increases or the charging current increases, one or both sets of regulator contacts will start vibrating and periodically introduce resistance into the input circuit of the field supply rectifier 260, so as to maintain the alternator output voltage and current within proper limits.

The dynamo-electric machine 20G of FIG. 13 may also be used as a single-phase synchronous motor, starting being effected in any conventional manner.

The modified form of commutator motor 20J shown in FIGS. 14 and 15 is generally similar to that of FIG. 9, but includes speed regulating means, as hereinafter described, and is so arranged that only two brushes are required, thus minimizing brush friction.

The stator 321 includes E-shaped laminated field cores 323 with field windings 33 on the middle legs, as in FIGS. 9 and 10 and further includes end frame members 324 and 325. The rotor 322 includes a pair of rotor body sections 338 and 339 which carry respective sets of angularly offset U-shaped cores 341 and 342, similar to those of FIGS. 9 and 10, except that the inner ends of the cores 341 and 342 overlap axially. The rotor further carries a pair of axially spaced armature windings 334 and 335 in coaxial relation, as in FIG. 9. However, each armature winding is center-tapped, the winding 334 forming two winding sections 334a and 334b, and the winding 335 forming two winding sections 335a and 335b. In some cases, the rotor windings are of the bifilar type. The rotor cores and armature windings are secured to rotor body sections 338 and 339, generally similar to those of FIG. 9, and mounted on a hollow shaft 336. At one end the rotor shaft carries an eight-segment commutator 376 on which bears a single brush 377 carried by the stator end member 324, the diametrically opposite commutator segments being cross-connected, as seen in FIG. 15. At its other end the rotor shaft carries a governor disk 378 of conventional construction per se supporting a pair of relatively vibratory speed-responsive contacts 379 and 380, and further carries a slip ring 381 on which bears a brush 382 carried by the stator end member 325. The governor contacts are suitably protected, as by a shunting capacitor 383 and resistor 384 carried by the disk.

The armature winding 334 has the outer terminal of its winding section 334a connected to diametrically opposite segments of the commutator by a conductor 385, and the outer terminal of the companion winding section 334b is connected by a conductor 386 to diametrically opposite segments of the commutator spaced 90° from the first segments. The other two-section armature winding 335 is similar connected by conductors 387 and 388 to two other pairs of diametrically opposite commutator segments spaced 45° from the first mentioned segments. The various motor connections extend through the hollow rotor shaft 336. The center taps of the rotor windings 334 and 335 are connected together and to the contact 379 of the speed governor by a conductor 389, and the other governor contact 380 is connected to the slip ring 381. The motor is energized from line conductors 60, 61 supplying either direct or alternating current. The line conductor 60 is connected to the commutator brush 377, and the stator or field windings 33, which are connected in series, have one terminal connected to the other line conductor 61, the other field terminal being connected to the slip ring brush 382 by a conductor 390. The field or stator windings are thus connected in serious with the armature windings and governor contacts. It will be seen that while a speed governor is provided, the motor requires only two brushes, thus reducing brush friction. A low brush friction is particularly desirable in the case of small or miniature motors.

In the operation of the motor of FIGS. 14 and 15, a circuit is established from line conductor 61 through the field windings 33, conductor 390, slip ring brush 382, slip ring 381, governor contacts 380 and 379, conductor 389, one of the four armature winding sections 334a, 334b, 335a, 335b, one of the conductors 385, 386, 387, and 388 associated with the winding sections, commutator 376, and commutator brush 377 back to the line conductor 60. At the time the commutator occupies the position shown in FIG. 15, the motor circuit extends through the armature section 334a and conductor 385, the circuit through the other three armature sections being open. The current flowing through the field windings 33 and armature winding section 334a magnetizes the left-hand halves of the stator cores 323 and the left-hand rotor cores 34, causing these left-hand rotor cores to be repelled by one group of field poles, for example the vertical poles, and to be attracted by the other group of field poles, thus exerting a torque on the rotor. As the rotor turns, assuming a clockwise direction of rotation in FIG. 15, the remaining armature winding sections 335b, 334b and 335a are energized in succession, continuing the torque on the rotor. During such rotation the poles of the stator cores are alternatively active on the left-hand and right-hand sides of the rotor cores. When the brush 377 bridges adjacent commutator segments, two of the winding sections, one in each of the armature windings 334 and 335, are simultaneously active. As soon as the motor reaches a predetermined speed, the governor contacts will start to vibrate at a high frequency, for example, 50 to 500 cycles per second, so as to maintain the governed speed.

The dynamo-electric machine of the invention is also capable of various other uses, including dynamometers, synchros, and the like.

I claim:

1. A dynamo-electric machine, comprising cooperating relatively rotatable members disposed in coaxial relation, a first one of said members being provided with a plurality of axially spaced sets of circumferentially disposed flux-conducting poles, each pole set having a plurality of poles, the second one of said members having sets of axially extending salient magnetic bar portions, one set of said magnetic bar portions being disposed to magnetically bridge the axially spaced poles of one pair of axially adjacent pole sets during relative rotation of said members, and a second set of said magnetic bar portions being disposed to magnetically bridge the axially spaced poles of another pair of adjacent pole sets during relative rotation of said members, said sets of salient magnetic bar portions having different mechanical phase relations with respect to the poles in the associated pairs of pole sets, and a plurality of axially spaced annular armature windings disposed coaxially of said members, one of said windings being linked with flux threading one set of said magnetic bar portions and the associated axially spaced poles, and another of said armature windings being linked with flux threading another set of said magnetic bar portions and the associated axially spaced poles.

2. A dynamo-electric machine, comprising cooperating relatively rotatable members disposed in coaxial relation, a first one of said members being provided with a plurality of axially spaced sets of circumferentially disposed flux-conducting poles, each pole set having a plurality of poles, the second one of said member having sets of axially extending salient magnetic bar portions, one set of said magnetic bar portions being disposed to magnetically bridge the axially spaced poles of one pair of axially adjacent pole sets during relative rotation of said members, and a second set of said magnetic bar portions being disposed to magnetically bridge the axially spaced poles of another pair of adjacent pole sets during relative rotation of said members, said sets of salient magnetic bar portions having different mechanical phase relations with respect to the poles in the associated pairs of pole sets, and a plurality of axially spaced annular armature windings disposed coaxially of said members, one of said armature windings lying in a radial plane between an adjacent pair of pole sets and linked with flux threading the axially spaced poles of said pole sets and the associated magnetic bridging portions, and another of said armature windings lying in a radial plane between another pair of pole sets and linked with flux threading the axially spaced poles of said latter pole sets and the associated magnetic bridging portions.

3. A dynamo-electric machine, comprising cooperating relatively rotatable members disposed in coaxial relation, a first one of said members being provided with a plurality of axially spaced sets of circumferentially disposed flux-conducting poles, each pole set having a plurality of poles, the second one of said members having sets of axially extending salient magnetic bar portions, one set of said magnetic bar portions being disposed to magnetically bridge the axially spaced poles of one pair of axially adjacent pole sets during relative rotation of said members, and a second set of said magnetic bar portions being disposed to magnetically bridge the axially spaced poles of another pair of adjacent pole sets during relative rotation of said members, said sets of salient magnetic bar portions having different mechanical phase relations with respect to the poles in the associated pairs of pole sets, and a plurality of axially spaced annular phase windings disposed coaxially of said members and carried by said first member, one of said phase windings lying in a radial plane between the poles forming one pair of axially spaced pole sets and linked with flux threading said pole sets and the associated magnetic bridging portions, and another of said phase windings lying in a radial plane between the poles forming another pair of axially spaced pole sets and linked with flux threading said latter pole sets and the associated magnetic bridging portions.

4. A dynamo-electric machine, comprising cooperating relatively rotatable members disposed in coaxial relation, a first one of said members being provided with a plurality of pairs of circumferentially disposed axially extending cores each having three axially spaced flux-conducting polar projections, the projections of said cores forming three axially spaced pole sets each having a plurality of poles, excitation means associated with each core for polarizing the intermediate projection thereof to one polarity and the other two projections to the other polarity, the successive poles in each pole set being of opposite polarity, the second one of said members having phase-displaced sets of axially extending salient magnetic bar portions, one set of said magnetic bar portions being disposed to magnetically bridge the poles of the intermediate pole set and an adjacent pole set during the relative rotation of said members, the second set of said magnetic bar portions being disposed to magnetically bridge the poles of the intermediate pole set and the other adjacent pole set during the relative rotation of said members, and a pair of axially spaced annular armature windings disposed coaxially of said members, one of said armature windings extending between the set of intermediate polar projections and one adjacent set of polar projections, and the other armature winding extending between the set of intermediate polar projections and the other adjacent set of polar projections.

5. A dynamo-electric machine, comprising an outer stator member and an inner rotor member, said stator member being provided with a plurality of circumferentially disposed axially extending cores each with a plurality of at least three axially spaced inwardly directed polar projections, the projections of said stator cores forming a plurality of at least three axially spaced sets of circumferentially disposed flux-conducting poles, closed circuit winding means on intermediate projections of said stator core, said rotor members having sets of axially extending salient magnetic bar portions, one set of said magnetic bar portions being disposed to magnetically bridge the axially spaced poles of one pair of adjacent pole sets during rotation of said rotor, and a second set of said magnetic bar portions being disposed to magnetically bridge the axially spaced poles of another pair of adjacent pole sets during rotation of said rotor, said sets of salient magnetic bar portions being offset with respect to each other, and a plurality of axially spaced annular phase windings coaxial with said rotor and carried by said stator, one of said phase windings being disposed between a pair of laterally adjacent sets of said polar projections, and another of said phase windings being disposed between another pair of laterally adjacent sets of said polar projections.

6. An electric motor, comprising a stator having three axially spaced sets of circumferentially disposed flux-conducting poles, each pole set having an even number, at least four, of poles of alternate polarity, the axially adjacent poles of said pole sets being of opposite polarity, excitation means for said poles, a rotor having first and second pairs of axially extending U-shaped magnetic cores each with a pair of outwardly directed polar projections and a recess between said projections, said first pair of rotor cores being disposed to magnetically bridge the poles of the intermediate pole set and an adjacent pole set during the rotation of the rotor, said second pair of rotor cores being disposed to magnetically bridge the poles of the intermediate pole set and the other adjacent pole set during the rotation of the rotor, said first pair of rotor cores being angularly and axially offset with respect to said second pair of rotor cores, annular armature windings coaxially carried by said rotor, one of said armature windings extending in the recesses of the first pair of rotor cores, the other armature winding extending in the recesses of the second pair of rotor cores, and current-conducting means connected to said armature windings.

7. An electric motor, comprising a stator having three axially spaced sets of circumferentially disposed flux-conducting poles, each pole set having an even number, at least four, of poles of alternate polarity, the axially adjacent poles of said pole sets being of opposite polarity, excitation means for said poles, a rotor having first and second pairs of axially extending U-shaped magnetic cores each with a pair of outwardly directed polar projections and a recess between said projections, said first pair of rotor cores being disposed to magnetically bridge the poles of the intermediate pole set and an adjacent pole set during the rotation of the rotor, said second pair of rotor cores being disposed to magnetically bridge the poles of the intermediate pole set and the other adjacent pole set during the rotation of the rotor, said first pair of rotor cores being angularly and axially offset with respect to said second pair of rotor cores, annular armature windings coaxially carried by said rotor, one of said armature windings extending in the recesses of the first pair of rotor cores, the other armature winding extending in the recesses of the second pair of rotor cores, and commutating means connected to said armature windings, said commutating means including an eight-segment cross-connected commutator of which quadrature segments are connected to one armature winding and other quadrature segments spaced 45° from said first quadrature segments are connected to the other armature winding.

8. A dynamo-electric machine according to claim 1, in which the pole sets form a field structure with permanent magnet excitation, the successive poles in each pole set being of opposite polarity, and axially spaced poles in adjacent pole sets being of opposite polarity.

9. A dynamo-electric machine according to claim 1, in which poles of the pole sets are formed by a plurality of at least three axially spaced polar projections on each of a plurality of axially extending circumferentially disposed cores, and in which excitation means is provided for an intermediate polar projection of each core to polarize said projection to one polarity and the other polar projections to opposite polarity.

10. A dynamo-electric machine according to claim 1, in which the poles of the pole sets are formed by a plurality of at least three axially spaced polar projections on each of a plurality of pairs of axially extending circumferentially disposed field cores, and in which an exciting winding surrounds an intermediate polar projection of each core, the successive poles of each pole set being of opposite polarity, and axially spaced poles in adjacent pole sets being of opposite polarity.

11. An alternating current motor according to claim 1, in which there are two armature windings forming phase windings adapted for connection to a single-phase power source, and in which a phase-shifting element is connected in series with one of said windings.

12. An alternating current machine according to claim 1, in which the armature windings form phase windings and have separate terminals.

13. A dynamo-electric machine comprising a pair of cooperating relatively rotatable members disposed one within the other, one of said members having axially spaced sets of poles, and the other of said members being a rotor including a pair of first and second coaxial rotor body sections in tandem relation, said rotor body sections carrying respective pairs of diametrically opposite axially extending salient magnetic bar portions disposed to bridge the axially spaced poles of adjacent pole sets during the relative rotation of said members, and said rotor body sections being relatively angularly shiftable about the rotor axis to adjust the angular relation of said pairs of magnetic bar portions, and a pair of axially spaced annular windings surrounding the respective rotor body sections and linked with the flux threading said poles and magnetic portions.

14. A dynamo-electric machine, comprising a pair of cooperating relatively rotatable members disposed one within the other, one of said members having axially spaced sets of poles, and the other of said members comprising a pair of coaxial body sections in tandem relation and carrying respective pairs of diametrically opposite axially extending salient magnetic bar portions disposed to bridge axially spaced poles of adjacent pole sets during relative rotation of said members, said body sections being relatively angularly shiftable about their axis to adjust the angular relation of said pairs of magnetic bar portions, and a pair of axially spaced annular windings surrounding the respective rotor body sections and linked with flux threading said poles and magnetic portions.

15. A dynamo-electric machine, comprising cooperating outer and inner relatively rotatable members, said outer member having a plurality of axially spaced sets of flux-conducting poles, each pole set comprising an even number, at least four, of equally spaced circumferentially disposed poles of alternate polarity, the axially adjacent poles of said pole sets being of opposite polarity, said second member having a pair of diametrically opposite axially extending salient magnetic bar portions for magnetically bridging said axially spaced pole sets during relative rotation of said members, and annular armature winding means disposed coaxially of said members at a region between the radial planes of said pole sets and adjacent to said pole sets to be linked by flux threading said poles and magnetic portions.

References Cited in the file of this patent

UNITED STATES PATENTS

| | | |
|---|---|---|
| 1,361,546 | Politowski | Dec. 7, 1920 |
| 2,498,793 | Critchfield et al. | Feb. 28, 1950 |
| 2,538,119 | Mironowicz | Jan. 16, 1951 |
| 2,630,541 | McElligott et al. | Mar. 3, 1953 |
| 2,660,681 | Horne | Nov. 24, 1953 |
| 2,908,854 | Rice | Oct. 13, 1959 |

FOREIGN PATENTS

| | | |
|---|---|---|
| 21,851 | Great Britain | Sept. 23, 1897 |
| 617,657 | France | Nov. 22, 1926 |